(12) United States Patent
Kao et al.

(10) Patent No.: US 6,236,504 B1
(45) Date of Patent: May 22, 2001

(54) METHOD AND DEVICE FOR ADJUSTING EYE RANGE BY MEANS OF DISPLACEMENTS OF PRISMS AND OCULAR LENSES

(75) Inventors: Po-Sung Kao, Taichung Hsien; Hao Tu, Taichung; Ming-Hung Wang, Taichung Hsien; Yuan-Kai Liu, Taichung, all of (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 09/482,576

(22) Filed: Jan. 13, 2000

(30) Foreign Application Priority Data

Dec. 21, 1999 (TW) .................................................. 88122500

(51) Int. Cl.[7] ............................. G02B 23/00; G02B 5/04
(52) U.S. Cl. ........................... 359/412; 359/835; 359/418
(58) Field of Search ..................................... 359/411, 412, 359/415, 416, 417, 418, 480, 481, 835, 407

(56) References Cited

U.S. PATENT DOCUMENTS 3,814,496 * 6/1974 Muka ..................................... 359/412
5,444,568 * 8/1995 Williams et al. ...................... 359/410

* cited by examiner

Primary Examiner—Cassandra Spyrou
Assistant Examiner—Jared Treas
(74) Attorney, Agent, or Firm—Browdy & Neimark

(57) ABSTRACT

A method is designed to adjust the distance between the central axes of two ocular lenses of an optical instrument. The method involves the use of a link mechanism to actuate two movable prisms and the two ocular lenses of the optical instrument to move respectively along a base surface such that the optical axes of effective diameters of the two movable prisms are coaxial with the optical axes of the corresponding ocular lenses.

7 Claims, 9 Drawing Sheets

METHOD AND DEVICE FOR ADJUSTING EYE RANGE BY MEANS OF DISPLACEMENTS OF PRISMS AND OCULAR LENSES

FIELD OF THE INVENTION

The present invention relates generally to an optical instrument, and more particularly to a method and a device for adjusting the eye range by displacing prisms and ocular lenses of the optical instrument.

BACKGROUND OF THE INVENTION

A binoculars is generally formed of a frame, two cylindrical bodies, and a focusing device. The cylindrical bodies are rotatably held by the frame and are provided therein with an objective lens set, a prism set, and an eyepiece set. The frame is provided with a receiving space in which a focusing device is disposed such that the focusing device is linked with the objective lens set. The eye range, which is the distance between the central axes of the two ocular lenses, is adjusted by swiveling the two cylindrical bodies. Such conventional method and device as described above should be revolutionized.

SUMMARY OF THE INVENTION

The primary objective of the present invention is to provide an innovative method and device for adjusting the eye range of an optical instrument by displacing prisms and ocular lenses of the optical instrument.

In keeping with the principle of the present invention, the foregoing objective of the present invention is attained by a method and a device, which involve the application of a link mechanism comprising a traction member for linking each movable prism and each movable ocular lens such that the central axis of effective diameter of each movable prism and the central axis of each movable ocular lens are coaxial. The traction member is actuated by an adjustment device to displace such that the two movable prisms and the two ocular lens move respectively along a base surface, and that the central axes of effective diameters of the two movable prisms and the central axes of the corresponding ocular lenses remain coaxial. The distance (eye range) between the central axes of the two ocular lenses is adjusted by moving the link mechanism.

The foregoing objective, features, functions, and advantages of the present invention will be more readily understood upon a thoughtful deliberation of the following detailed description of a preferred embodiment of the present invention with reference to the accompanying drawings.

DETAILED DESCRIPTION OF THE INVENTION

Figure 1:
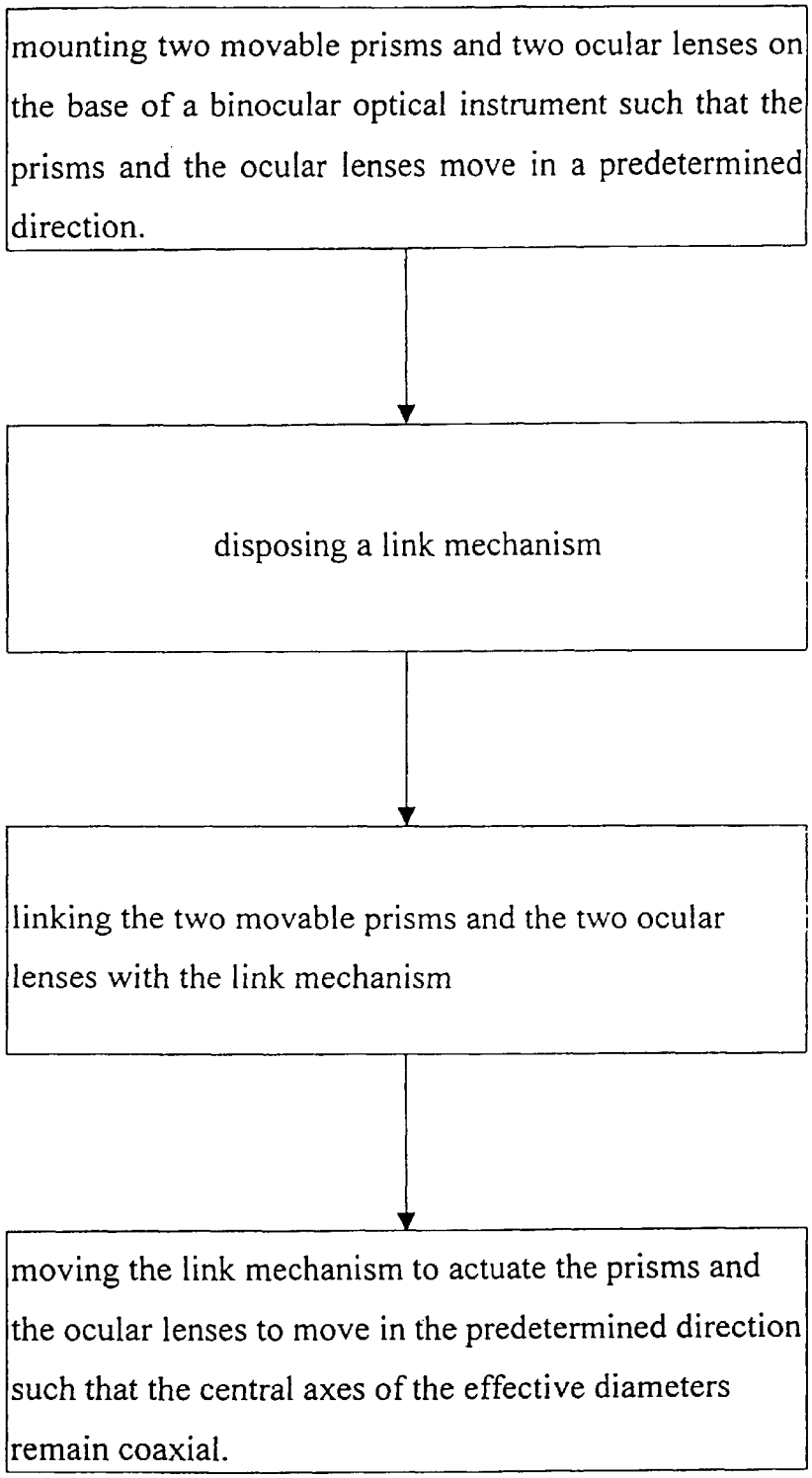
FIG. 1 shows a flow chart of a method of the present invention for adjusting the distance between the central axes of two ocular lenses of an optical instrument.

As shown in FIG. 1, a method embodied in the present invention is applicable on a binocular instrument, such as a binocular laser range finder, a binoculars, etc. The method involves a first step in which two movable prisms and two movable ocular lenses are disposed on the base of a binocular optical instrument such that the prisms and the objective lenses can be moved in a predetermined direction by a link mechanism which is connected with the prisms and the ocular lenses, and that the prisms and the ocular lenses are coaxially moved along the optical path. The two ocular lenses can be thus moved toward each other or away from each other by moving the link mechanism, thereby resulting in the adjustment of the distance (eye range) between two central axes of the two ocular lenses. The principle of the method of the present invention is described explicitly hereinafter.

Figure 2:
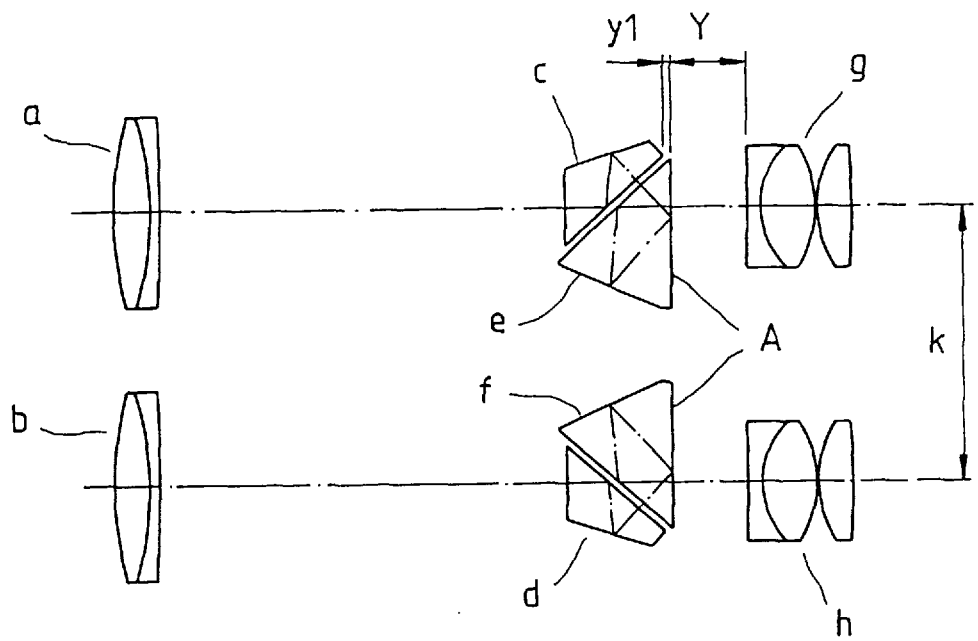
FIGS. 2 and 3 are schematic views of the optical system of the present invention to show the change in optical axis at the time when the prisms and the ocular lenses are displaced.

As shown in FIG. 2, an incident light first encounters with the objective lenses a and b before it is refracted by the prisms c, d, e, and f. Thereafter, the light comes out of the ocular lenses g and h. In light of the angle of incidence being equal to the angle of reflection, the central axis of the effective diameter of the outer side (A side) of each of the prisms e and f is coaxial with the central axes of the ocular lenses g and h. In the meantime, the prisms c, d and the movable prisms e, f have a horizontal distance which is designated as y1. The outer side (a side) of the prisms e and f, and the center point of the front of the ocular lenses g and h have a horizontal distance which is designated as Y. The distance between the central axes of the two ocular lenses g and h is the eye range which is designated as K.

Figure 3:
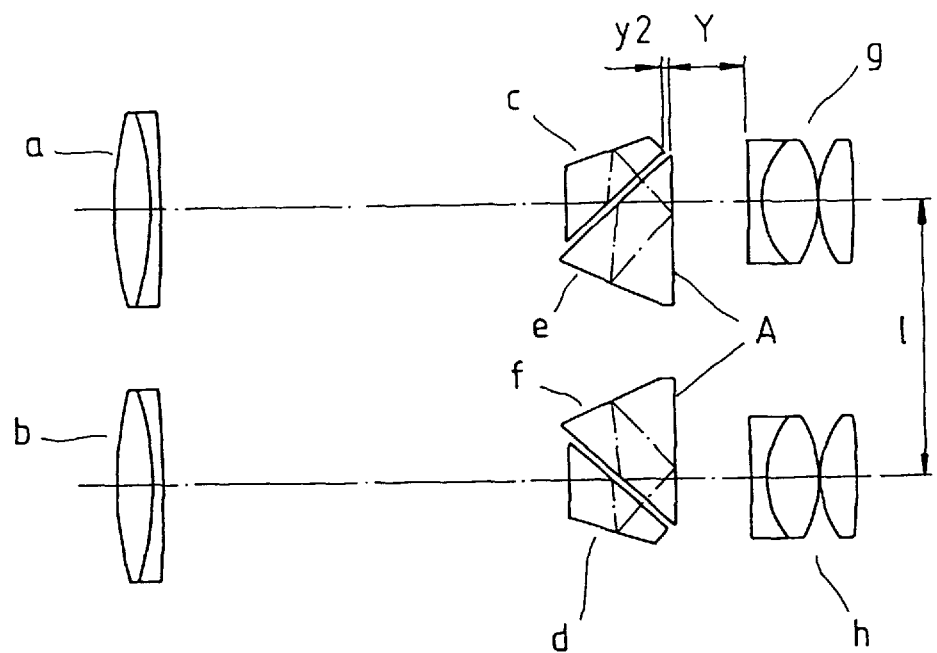

As shown in FIG. 3, when the prisms e and f are moved respectively along the directions B1 and B2 such that they and the prisms c and d have a horizontal distance which is designated as y2, thereby resulting in the quantity of movement of the prisms e and f being y1–y2, as shown in FIG. 2. In the meantime, the horizontal distance Y remains unchanged. In addition, the eye range I of the two objective lenses g and h is smaller than the eye range K. As a result, the eye range becomes smaller as the prisms e and f are moved along the B1 and the B2 directions. The amount of the change in the eye range is corresponding to the value of K–I. On the other hand, if the prisms e and f are moved in opposite directions along the B1 the B2, the value of the eye range becomes greater.

Figure 4:
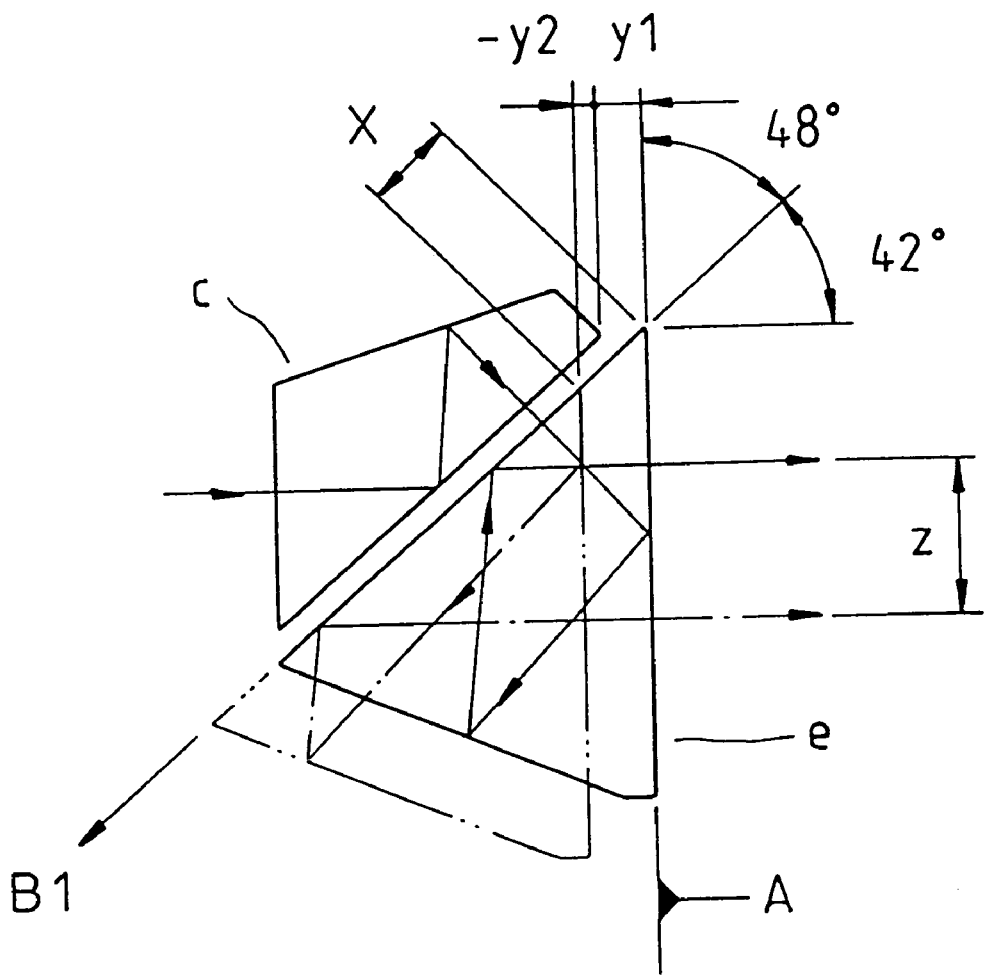
FIG. 4 shows an enlarged view of the change in path of optical axis at the time when the displacement of the prisms of the optical system of the present invention takes place.
Figure 5:
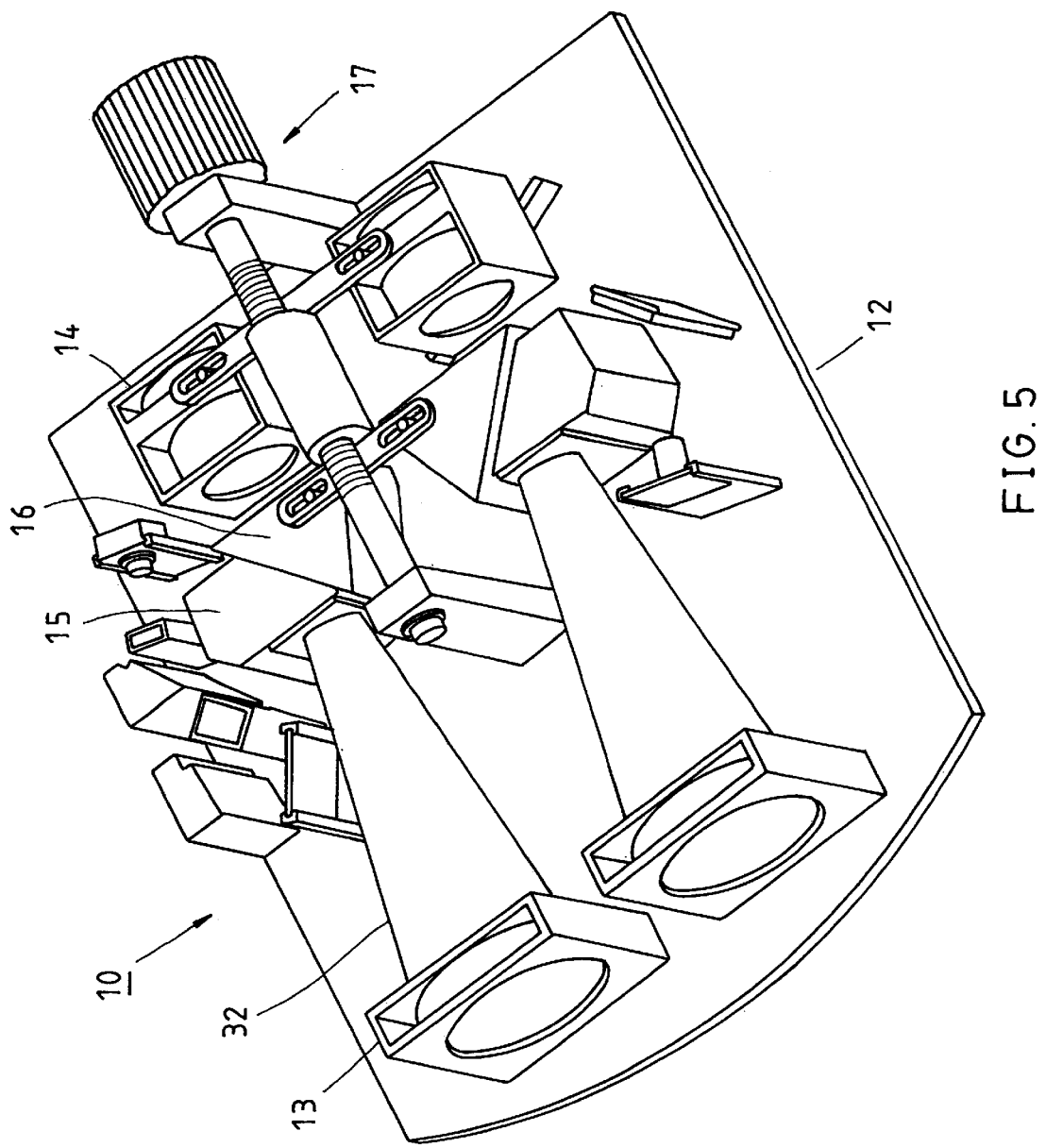
FIG. 5 shows a perspective view of a laser range finder of the preferred embodiment of the present invention.
Figure 6:
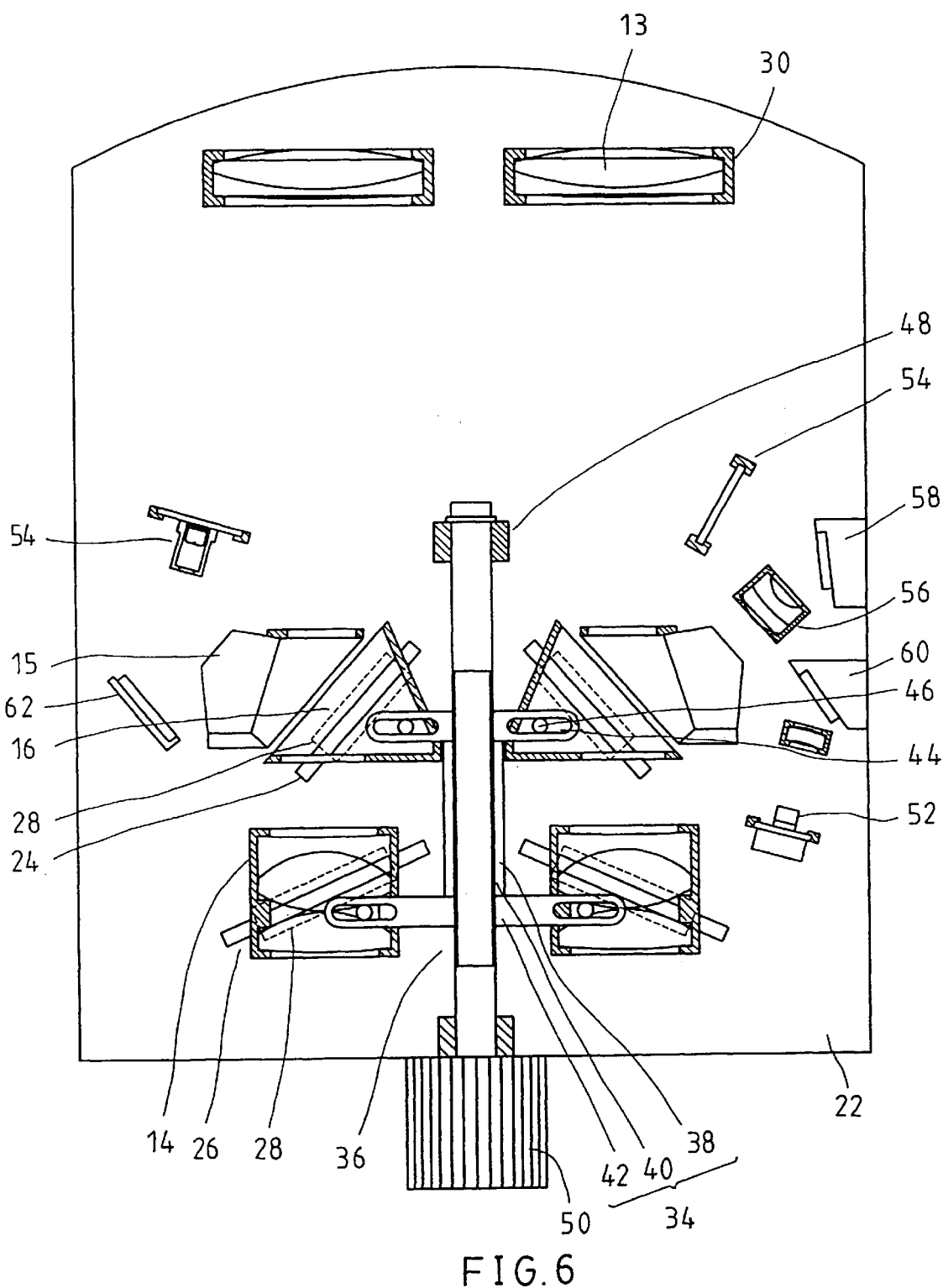
FIG. 6 shows a top view of the laser range finder of the preferred embodiment of the present invention.
Figure 7:
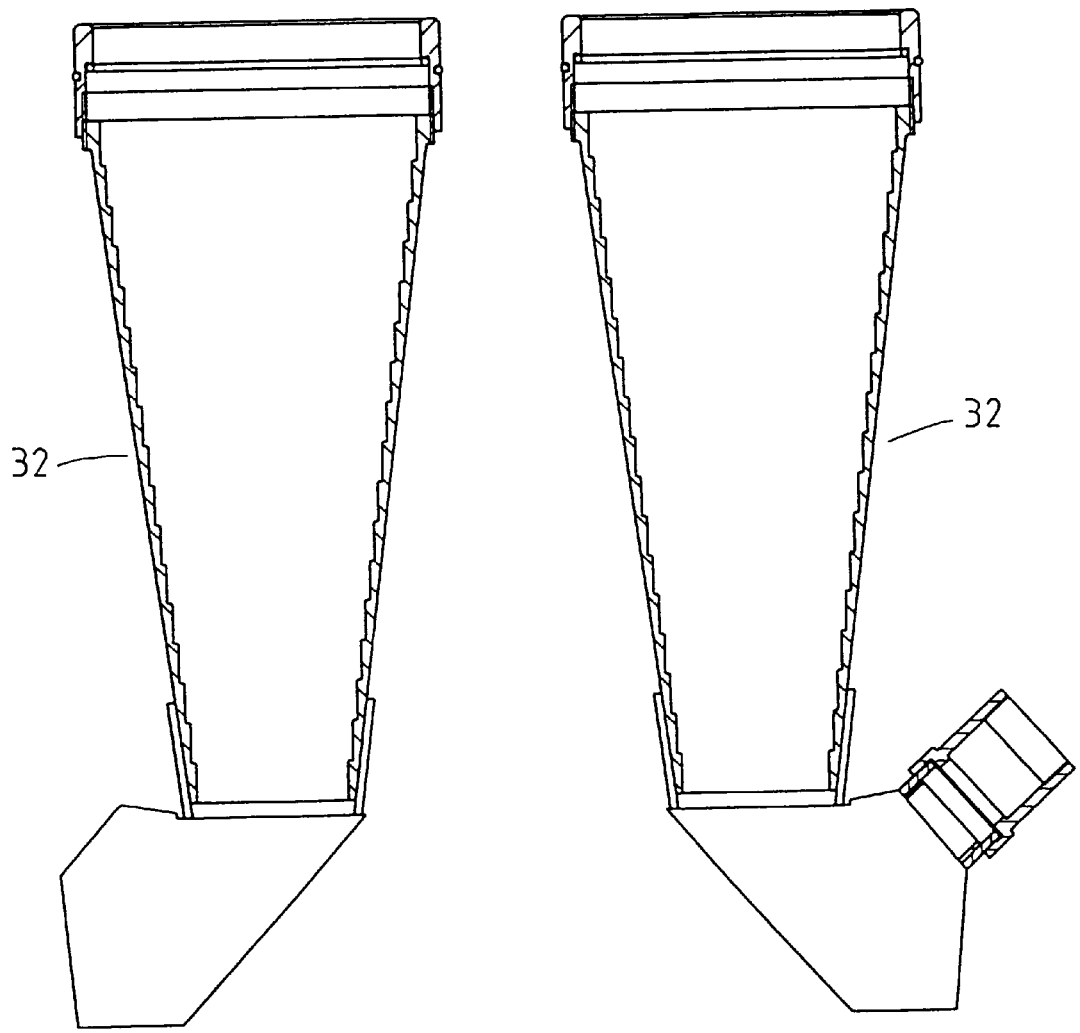
FIG. 7 shows a sectional view of a support frame of the laser range finder of the preferred embodiment of the present invention.
Figure 8:
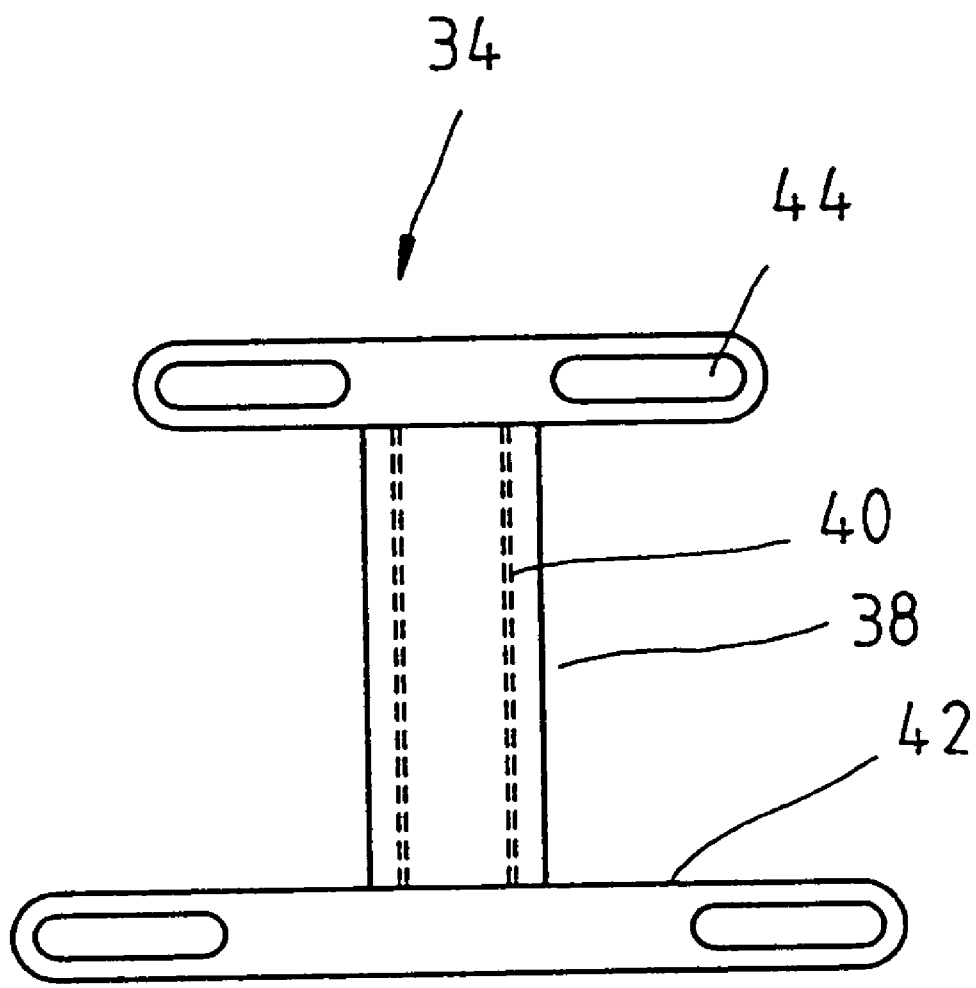
FIG. 8 shows a plan view of a traction member of the laser range finder of the preferred embodiment of the present invention.

As shown in FIG. 4, when the prism e is moved along the B1 direction by a distance which is designated as X, the main optical axis moves in the direction of the A side effective diameter by a distance which is designated as Z[X(1+sin 42)], which is a half of the amount of change in eye range. Moreover, the eye range is smaller than the original value.

As shown in FIGS. 5–8, a laser range finder 10 of the preferred embodiment of the present invention is designed on the basis of the principle described above. The laser range finder 10 comprises a base 12, two objective lens sets 13, two ocular lenses 14, two fixed prism cases 15, two movable prism cases 16, and a link mechanism 17.

The base 12 has a bottom plate 22, two first tracks 24, and two second tracks 26. The tracks 24 and 26 are mounted oppositely on the bottom plate 22 such that the axes of the corresponding tracks 24 and 26 are separated by an angle of 24 degrees or so. The tracks 24 and 26 are provided with a slide seat 28, which is a linear slide rail. The bottom plate 22 is provided at the front end thereof with two frames 30 opposite to each other, and two support frames 32 opposite to each other such that the front ends of the two support frames 32 are received in the two frames 30.

The two objective lene sets 13 are respectively mounted in the front ends of the two support frames 32 and are composed of a plurality of objective lenses. The two ocular lens sets 14 are fixed on the slide seats 28 of the second tracks 26 and are composed of a plurality of ocular lenses. The two fixed prism cases 15 are provided therein with a fixed prism, which is mounted in the rear end of the support frame 32 and is corresponding in location to the first track 24. The two movable prism cases 16 are provided therein with a movable prism, which is disposed on the slide seat 28 of the first track 24. The axial direction of each first track 24 and the central axis of the objective lens 13 form an angle of 48 degrees or so. The axial direction of each second track 26 and the central axis of the objective lens 13 form an angle of 24 degrees or so.

The link mechanism 17 is formed of a traction member 34 and an adjustment device 36. The traction member 34 has a main body 38 which is provided at the center thereof with a threaded hole 40 and is further provided with four connection ends 42 extending therefrom. Each of the four connection ends 42 is provided with an oval guide slot 44 in which a retaining block 46 is disposed. The retaining block 46 is located at the movable prism case 16 and the top of the ocular lens 14. The adjustment device 36 is composed of a support body 48 and a drive member 50 which is a threaded rod and is fastened with the support body 48 via the threaded hole 40. The drive member 50 turns along the axis of the support body 48 without being able to move in relation to the support body 48.

Figure 9:
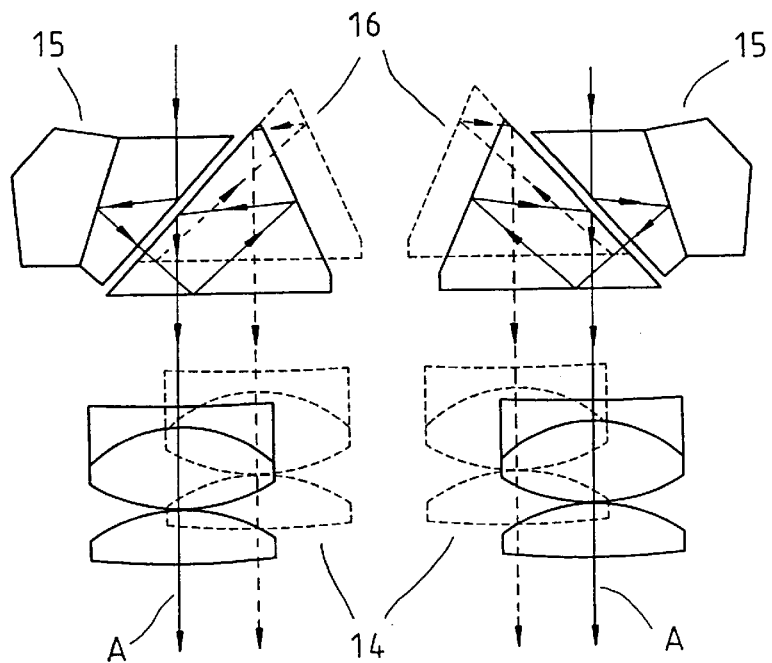
FIG. 9 is a schematic view of the laser range finder of the preferred embodiment of the present invention in action such that the ocular lenses and the prisms have moved toward each other.
Figure 10:
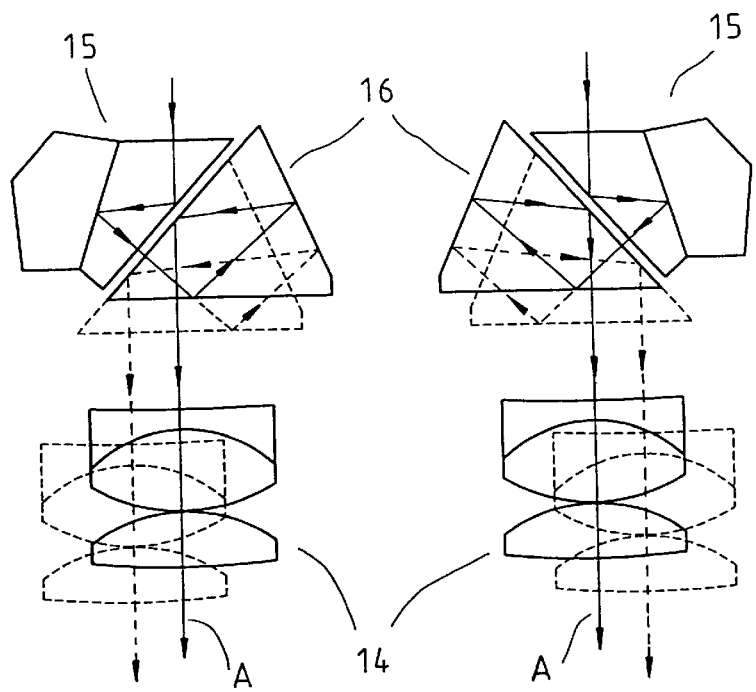
FIG. 10 is a schematic view of the laser range finder of the preferred embodiment of the present invention in action such that the ocular lenses and the prisms have moved away from each other.

As the drive member 50 turns, the movable prism cases 16 and the ocular lenses 14 are actuated by the traction member 34 to move on the slide seats 28 such that the central axes of effective diameters of the two movable prism cases 16 and the central axes of the corresponding ocular lenses 14 remain coaxial, thanks to the design of the 24-degree angle of the first track 24 and the second track 26. The visible light A is projected on the eyes of a user from the ocular lenses 14 via the objective lenses 13, the fixed prism cases 15, and the movable prism cases 12. The link mechanism 17 actuates the movable prism cases 16 and the ocular lenses 14, thereby causing the two ocular lenses 14 to move toward or away from each other. As a result, the distance between two central axes of the two ocular lenses 14 is adjusted by moving the link mechanism 17, as illustrated in FIGS. 9 and 10.

Figure 11:
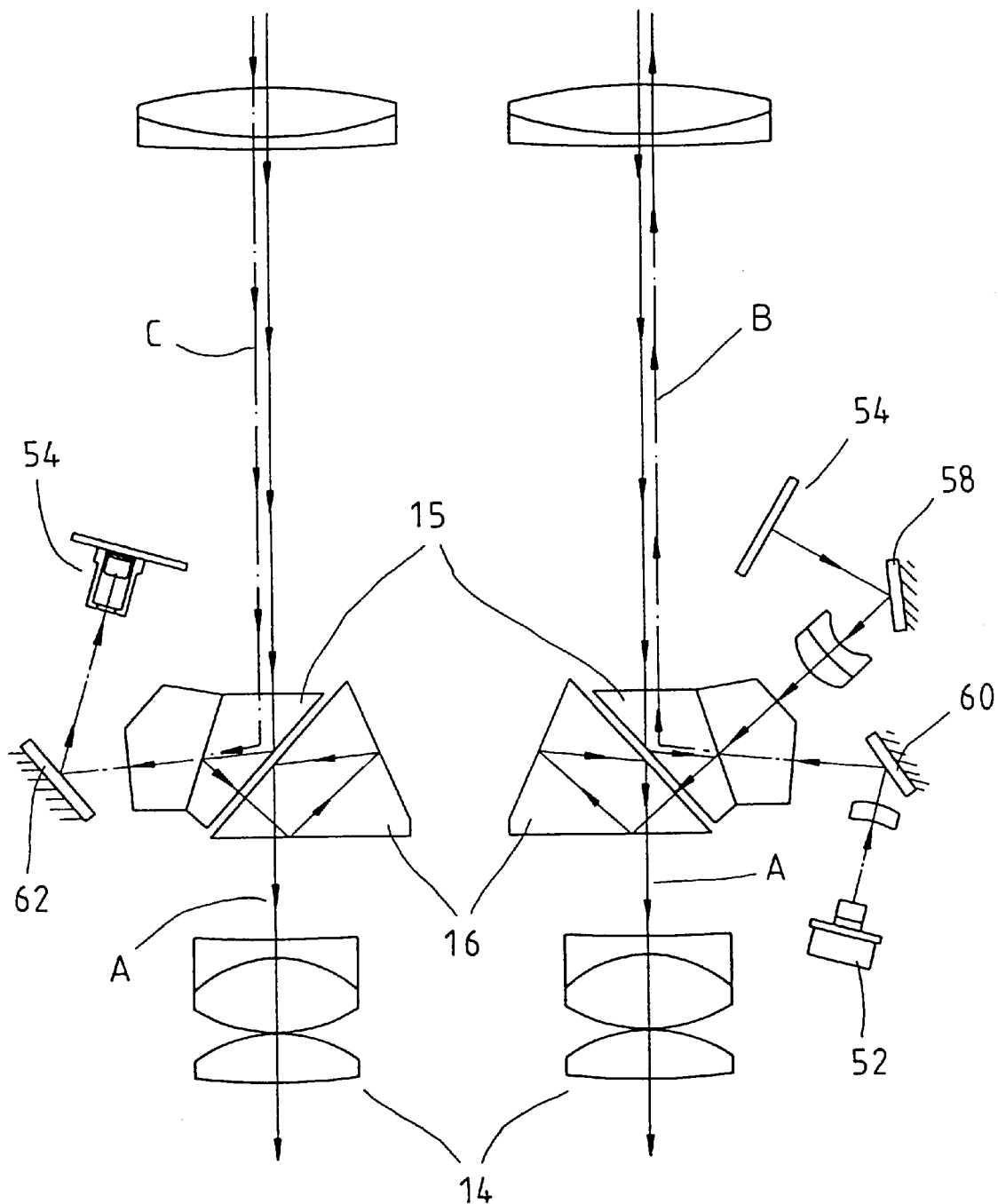
FIG. 11 shows a schematic view of the visible light path and the laser path of the laser range finder of the preferred embodiment of the present invention.

The laser range finder 10 further comprises a laser-emitting diode 52, a laser-receiving diode 54, a light-emitting diode PC board 56, and three reflectors 58, 60 and 62 which are disposed on the bottom plate 22 to enable a laser-emitting optical path B to project on an observation point via the fixed prism case 15 and the objective lens 13. In the meantime, the laser receiving optical path C is received by the laser-receiving diode 54 via other one objective lens 13 and other one fixed prism case 15, as shown in FIG. 11. The present invention is applicable to any binocular optical instrument, such as a binoculars, in addition to the laser range finder 10 described above.

What is claimed is:

1. A binocular optical instrument comprising:
   a base;
   two objective lens sets mounted oppositely on one end of said base and provided with an objective lens;
   two ocular lens sets mounted oppositely on other end of said base such that said two ocular lens sets are movable and corresponding in location to said two objective lens sets whereby said two circular lens sets are provided with an ocular lens;
   two fixed prisms disposed between said two objective lens sets and said two ocular lens sets;
   two movable prisms disposed movably between said two fixed prisms and said two ocular lens sets;
   a link mechanism disposed on said base and formed of a traction member connected with said movable prisms and said ocular lens sets, said link mechanism further formed of an adjustment device for driving said traction member so as to enable each of said movable prisms and a corresponding ocular lens set to move in relation to each other;
   wherein said two movable prisms are moved in a direction forming an angle of 48 degrees along with a central axis of said objective lens sets; and
   wherein said two ocular lens sets are moved in a direction forming an angle of 24 degrees along with a central axis of said objective lens sets.

2. The binocular optical instrument as defined in claim 1, wherein said base is provided with a plurality of tracks, with each being provided with a slide seat; wherein said ocular lens sets and said movable prisms are mounted on said slide seats.

3. The binocular optical instrument as defined in claim 1, wherein said traction member has a main body and four connection ends extending from said main body; wherein said movable prisms and said ocular lens sets are connected with said connection ends; wherein said adjustment device is connected with said main body.

4. The binocular optical instrument as defined in claim 3, wherein said connection ends are provided with a guide slot; wherein said movable prism cases and said ocular lens sets are provided with a retaining block whereby said retaining block is movably disposed in said guide slot.

5. The binocular optical instrument as defined in claim 3, wherein said adjustment device comprises a support body and a drive member mounted on said support body such that said drive member is connected with said main body.

6. The binocular optical instrument as defined in claim 5, wherein said drive member is a threaded rod whereby said threaded rod is mounted on said support body via said threaded hole of said main body.

7. The binocular optical instrument as defined in claim 6, wherein said drive member turns on an axis such that said drive member does not move in relation to said support body.

* * * * *